Dec. 6, 1966 F. P. WILLCOX ET AL 3,290,439

DATA ENCODING KEYBOARD

Filed April 29, 1963 2 Sheets-Sheet 1

DATA ENCODING KEYBOARD

Filed April 29, 1963 2 Sheets-Sheet 2

3,290,439

DATA ENCODING KEYBOARD

Frederick P. Willcox, 261-1 Oenoke Ridge, New Canaan, Conn., and Newland F. Smith, New Canaan, Conn.; said Smith assignor to said Willcox Filed Apr. 29, 1963, Ser. No. 276,524
10 Claims. (Cl. 178—17)

This invention pertains to keyboards for manual operation to produce selective energization of output conductors according to a permutation code; for example, to encode data, especially alphanumeric characters and control functions, into suitable form for use by computers, for transmission over wire or radio circuits, and for other purposes.

Keyboard encoding functions of the above type have been accomplished heretofore by a variety of schemes, such as the electromechanical keyboard translators of teletypewriters, key-controlled diode or triode matrices and the like, and key-controlled relay trees. Such devices are costly, bulky, and complex, require substantial operating power, and some are subject to the environmental limitations of their electronic components. Also, they do not provide for changing the encoding schemes except by complete reconstruction or rewiring.

The present invention provides a keyboard construction which is essentially mechanical in nature, in that no power supply is needed to achieve the encoding function, and in which the coding scheme is quickly changeable by very simple means. The construction is compact and rugged, fully sealed against atmospheric hazards, requires only light operating or finger pressure, and can be operated at very high speeds compared to known keyboards or translating devices of the same general type.

The encoding function generally requires the completion or circuits to a limited number of output conductors, totalling usually six or eight, in combinations uniquely selected by the operation of successive keys or buttons of a much larger number, such as 40 or more in the case of a standard alpha-numeric keyboard. In view of the combinatorial nature of the output, it is essential that there not be significant errors in the simultaneity of contact closures, or at least that the read-out condition be restricted to an interval in which all of the selected contacts are in fact in their operated state. The difficulty in ensuring this has probably been one of the reasons why the art has moved in the direction of diode matrix and other sophisticated electronic keyboards, even for purely manual operation.

Briefly, the present invention provides a keyboard in which all possible output conductor combinations are represented by a printed circuit plate, to whose bus conductors a common circuit is established by the selective operation of keys which move selective groups of contact fingers into engagement with such bus conductors. Any desired encoding scheme is readily provided by the insertion of a thin insulating sheet, selectively perforated, between the movable fingers and the circuit board, to prevent the selection of certain conductors by each key, without altering the uniform operating pressure which is desired. The motion of each group of contact fingers is produced by a finger-operated snap action or over-center disc spring which also itself forms the operating "key." Flexible sheets overlying the plane of these key discs provide for the visible key markings as well as for environmental protection of the sandwich assembly.

The invention will be described below in connection with a particular and presently preferred embodiment, but the details thereof are to be taken as illustrative rather than limiting; the actual scope of the invention being defined in the claims. In the drawings, FIG. 1 is a plan view of the complete keyboard, successive layers being broken away to reveal the underlying structure.

Figure 1:
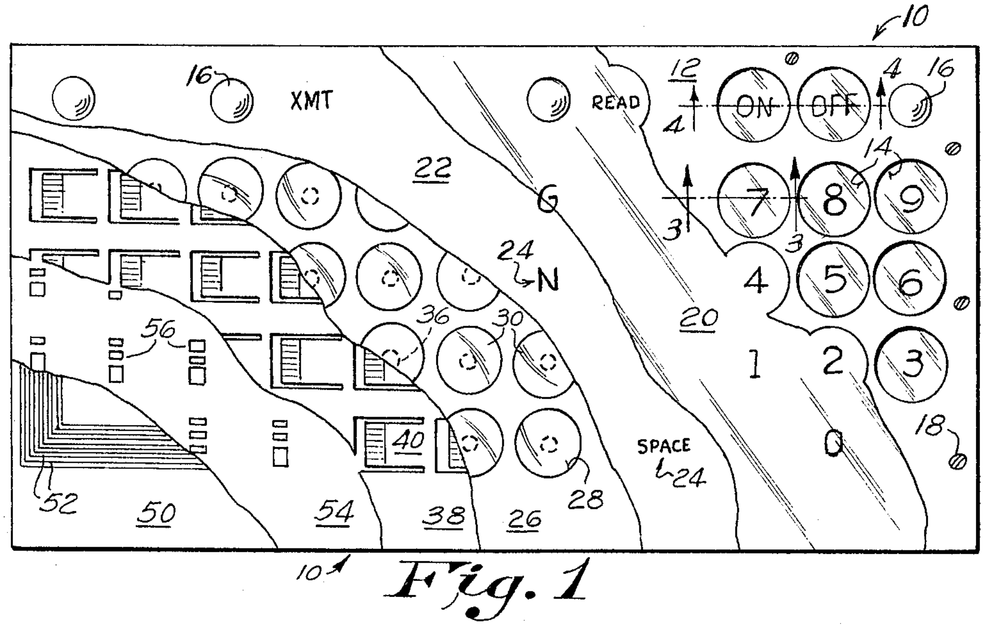
Figure 2:
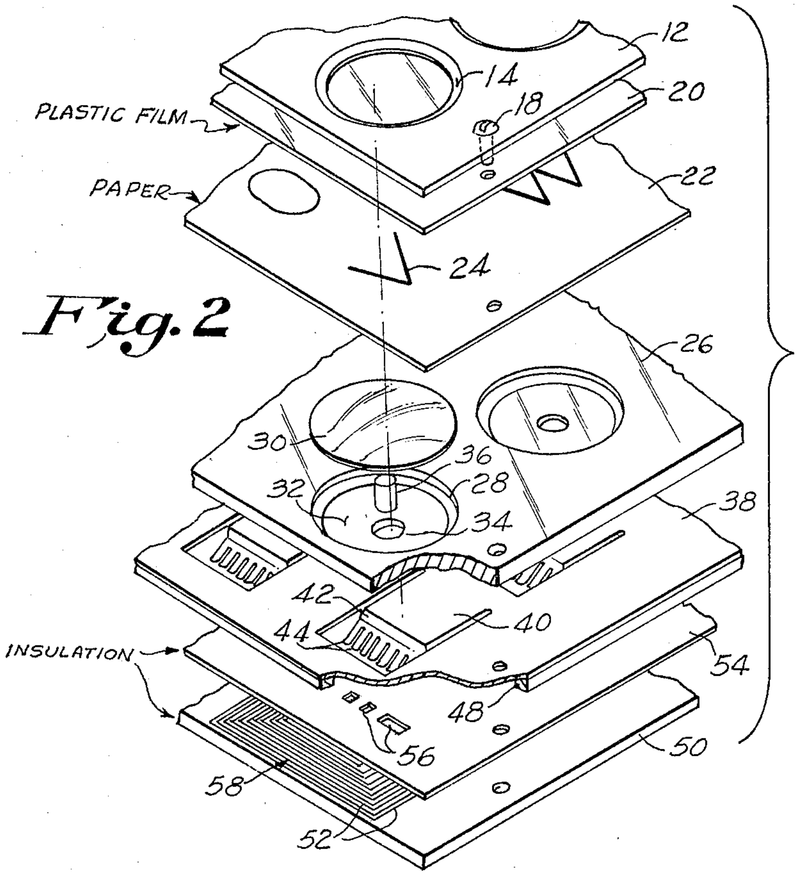
FIG. 2 is an exploded perspective view of a corner of the keyboard.

Referring now to FIGS. 1 and 2 of the drawings, the keyboard as a whole is designated by numeral 10, having for example profile (plan) dimensions of about 5 by 8 inches and a total thickness of about ⅜ inch. The device is fabricated as a pile-up or sandwich of essentially planar sheets or layers, giving a very compact and sturdy construction.

The uppermost layer, which is the one facing the user, consists of a cover plate 12 of metal or rigid plastic material perforated by beveled holes or apertures 14 defining the locations for finger-pressure operation of the device. This board or layer 12, and underlying layers, may additionally be perforated to receive signal lamps such as 16, where such are desired, and to receive assembly screws as at 18.

Immediately beneath board 12 there is preferably provided a layer or film 20 of tough, transparent, flexible, impervious plastic sheet stock such as "Mylar" or the like, which is imperforate except for the assembly-screw holes at its edges. This layer isolates the underlying parts from environmental dust, corrosive effects and the like, but flexes to transmit finger pressure in the downward direction.

Beneath layer 20 is positioned a sheet 22 of tough but flexible sheet material, such as paper, on which are printed (as at 24) the indicia (letters, numerals and the like) which are to show through plastic film 20 and the respective apertures 14 of cover plate 12. Like layer 20, sheet 22 is such as can flex locally to transmit the finger pressure to individual operators which will be described below.

The fourth layer of the pile-up is again a rigid apertured plate 26, preferably of metal, which is at each key position locally recessed from its upper surface, in a circular configuration to provide a recessed lip 28 in vertical alignment with each aperture 14 to receive, and to support by its rim, a circular snap-disc such as shown at 30. The discs are formed from thin sheet stock such as Phosphor bronze, beryllium copper or steel spring stock, and each disc is given a permanent "domed" configuration to provide the vertical snap action. The degree of its deformation is adjusted, relative to the vertical displacement of its center permitted by the dimensioning of the underlying parts, so that its lower or depressed condition is unstable. That is, when the downward finger pressure is released, the disc will snap back up into its stable, upwardly-domed condition.

Discs 30 may be held in place on the lips 28 merely by the presence of the upper sheets, but it is preferred to secure them in place as by staking the rims of the recesses 28. These recesses do not pass entirely through plate 26, but their bottoms 32 are centrally perforated at 34 to pass the short, loose pins 36 of metal or plastic, by which the downward deflection of each disc 30 is conveyed to the circuit contacts to be described. The perforated thickness of the bottoms of the recesses is such as to captivate these loose pin elements in a manner better shown in FIG. 3.

Beneath plate 26 is positioned the contact finger sheet 38 which is formed of metal spring stock blanked (or etched) to provide, beneath each disc 30, a set of contact fingers operable as a unit when depressed by a pin 36. At each such location, the blanking provides a tongue 40 having integral connection to the sheet body at one end only (the right end in the figures of the drawing). At an intermediate point of its length, each tongue 40 is bent downwardly as at 42, and thence at an angle to provide an inclined end which is slitted to provide plural (herein eight, for example) individual wiping contact fingers 44. Methods of forming and shaping such a sheet, as by the use of progressive or multiple dies, will be obvious to those skilled in metal working.

Figure 3:
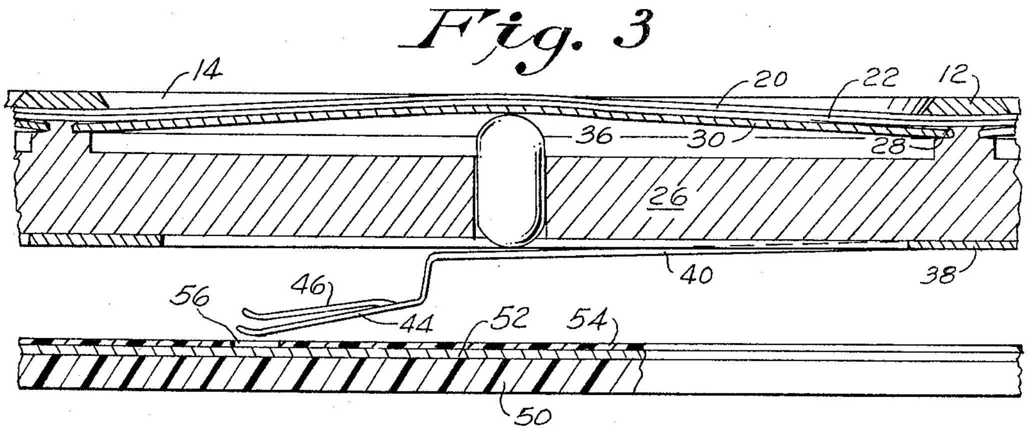
FIG. 3 is an enlarged vertical sectional view taken along line 3—3 of FIG. 1.

Since the tips of the contact fingers of each tongue, if in perfect planar alignment, would all simultaneously engage an underlying set of co-planar contact busses, a last-to-operate contact finger is readily provided, for each tongue 40, by purposefully bending one finger to a shallower angle than the others, as at 46 in FIG. 3. Such a contact is used to ensure that contact-selection output is provided only at an instant when closure of all of the other (code-selecting) contacts 44 has been accomplished. Also, the last-to-operate contact permits a certain tolerance as to coplanarity of the other (coding) contact fingers.

The rim of contact sheet 38 may preferably be thickened or reinforced as at 48 (FIG. 2) to provide operating space for the contact tongues and fingers. However, the travel of fingers 44 need be only a few thousandths of an inch for moderate control-circuit voltages. The lateral self-cleaning or "wiping" action at the tip of each contact finger is apparent in FIG. 3, especially. It may be noted that the contact surface of the fingers, at least, (and of the underlying busses which they engage) are preferably plated with a noble metal such as gold, rhodium or the like.

The ultimate or bottom plate of the keyboard is a rigid insulating sheet 50 of printed circuit type, bearing groups of bare conductors 52 shown as extending lengthwise of the sheet 50 and aligned beneath the respective rows of contact fingers. Corresponding conductors of these groups will ordinarily be multiplied (connected in parallel) to one another, for example in the six- or eight-unit code systems mentioned above. However, such multipling is not essential, for other coding schemes may be utilized. Plate 50 may have threaded holes to receive the assembly screws 18, and it may mount the lamps 16, and be grooved or recessed where required to accommodate signal and power conductors.

It will be obvious from the above that any specified coding scheme could be adopted in various ways. For example, undesired contact fingers 44 could be removed or bent up so as to become permanently inactive, or the exposed busses 52 could be routed down or selectively coated with insulation in selected regions beneath each group of contact fingers. Such systems do not facilitate either code changing or efficient manufacture of plural types of keyboards.

Accordingly, it is preferred to achieve the desired coding scheme by the use of a selectively perforated insulative sheet 54 interposed between sheets 38 and 50. In regions underlying each group of contact fingers, these perforations 56 permit only the chosen fingers to engage the conductors 52 when a selected "key" (disc 30) is depressed. Sheet 54 may be thin plastic, card stock or the like, and may if desired be punched or drilled singly or in multiple by conventional statistical machine equipment.

Since both the coding sheet 54 and the visible-indicia sheet 22 are readily exchangeable and are inherently of low cost, the coding flexibility of the described arrangement is apparent. Environmental, and ever hermetic, sealing of the keyboard is extremely simple, as the layers or sheets 20 and 50 may be of highly impervious materials, and the entire pile-up may additionally be edge-sealed and even overcoated if expedient.

In a typical wiring arrangement, each of the contact tongues may have eight contact fingers 44, six of these for example making the selective contact combinations for a six-bit message code, one being used to make (or not to make) a contact with a parity-checking bus to ensure odd-ness or even-ness, as required by the system, for the total number of bits per code character, and the remaining finger of all the tongues operating a bus to the "start" circuit, especially for parallel-to-serial conversion where serial output pulses are desired. FIGS. 1 and 2 do not attempt to indicate precisely a wiring arrangement, but it is to be noted that in the actual layout of the printed circuit board 50, it is not necessary to provide physically separate jumpers for the corresponding busses of the sets of eight corresponding to the different rows of keys. It is more convenient, as suggested at 58 in FIG. 2, to arrange the eight conductors so as to swing back and forth across the board and make a 180-degree turn at each end, either by round or square corners. While this interchanges the order or succession from the No. 1 bus through the No. 8 bus (as between successive rows of keys), the inversion is only physical, since the proper contacts to give the desired output for each key can still be selected as desired. Only a single set of eight output connections thus needs to be made, at either end of the quasi-serpentine strip of eight busses.

Figure 4:
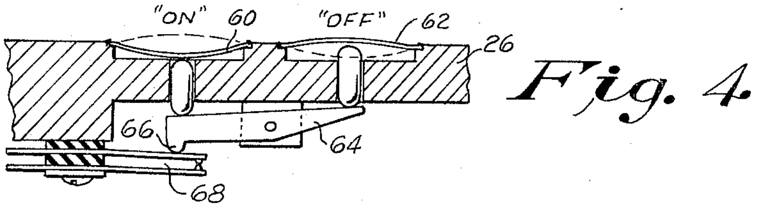
FIG. 4 is a sectional view on line 4—4 of FIG. 1.

In the fabrication of the snap discs 30 as described above, the relation of the amount of doming distortion to the diameter and gauge or thickness of the sheet metal was selected so that the upwardly-domed condition illustrated in FIG. 3 is the stable or normal, unactuated condition, to which the disc will return by itself after having been depressed by the operator's finger. FIG. 4, which is a schematic fragmentary section taken along the line 4–4 of FIG. 1, shows a variation in which each disc is actually bi-stable. Here, the disc doming distortion is chosen so that when either of the discs 60 or 62 is depressed, it remains in its lower position until forcibly restored to the upper condition. The restoration is accomplished by a rocker 64 pivoted beneath the panel 26, and having a lug 66 to engage and operate a pair of light spring contacts 68 in the "on-off" circuit of the keyboard. The contact spring pressure is chosen to be insufficient to restore the disc 60 (or 62) upwardly, so that the circuit closed by operation of disc 60 will stay closed until disc 62 is operated, and vice versa.

In many applications of keyboards, it is desired that the output be a serial "word," or series of successive current pulses such as the ordinary teletypewriter or computer code. A simple and advantageous arrangement for converting the time-parallel sets of contact closures resulting from each key operation to a time-serial sequence of pulses, is illustrated in schematic form in FIG. 5 of the drawings. Here, the multiplied busses of previous figures are again indicated by numeral 52, and one set of the key contact fingers is indicated by 70. The common connection for a direct current supply is indicated by the "+" terminal (e.g., to sheet 38 of FIG. 3) and the negative source terminal is grounded.

Figure 5:
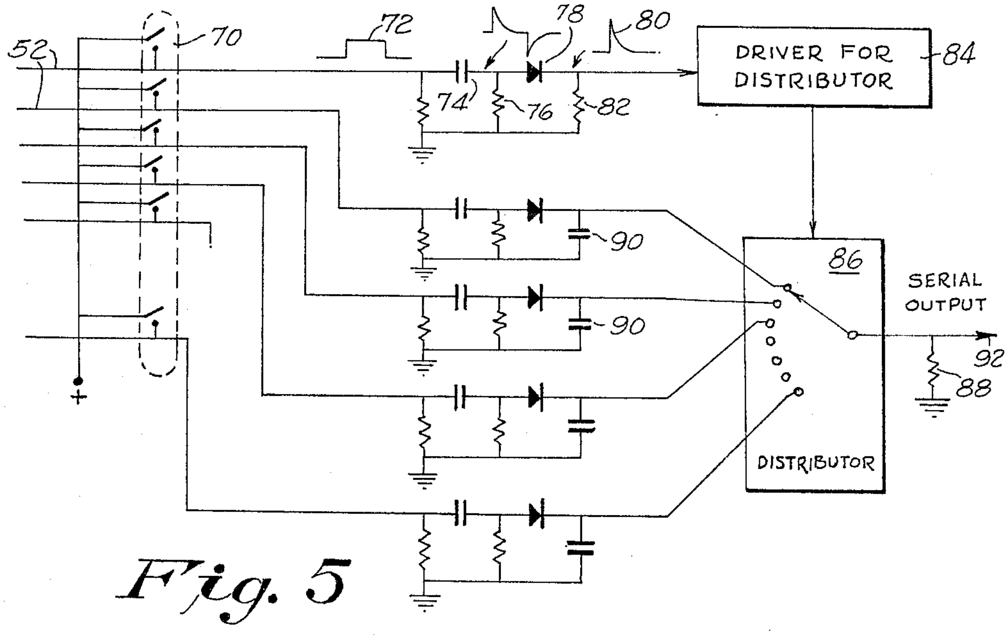
FIG. 5 is a schematic diagram of the keyboard arranged for parallel-to-serial output conversion.

The opening and closing of the supply circuit to a given bus, by each of the key contacts, represents, in effect, a positive-going rectangular pulse 72. The top line in FIG. 5 is the "start" pulse controlled conductor (energized "last" by finger 46 in FIG. 3), and the rectangular pulse is differentiated by condenser 74 and resistor 76, producing the positive- and negative-going peaks indicated, in the usual way of short-time-constant differentiators. The diode 78 conducts only the positive-going current, producing a voltage pulse 80 across the load resistance 82 and thus firing the "start' control 84 of the distributor 86, which may be a ring counter, a rotary sampling-type switch, or any equivalent device.

However constituted, the distributor 86 connects the outputs of the other key-controlled lines in sequence across the load resistor 88. Each of these other lines also fires a differentiator, just as did the top line conductor, for each of the code-selected contact fingers energized from the source. As to these lines, however, the energy contained in the output pulse (indicated by 80 for the top line) is "integrated" by the capacitors 90, so that the output pulse duration is abundantly long to produce the desired bit-length in the sequence of output pulses delivered to the serial-output terminal 92. The time constants of the components are sufficiently short to ensure effective discharge of the capacitors within the normal interval between key operations, and of course the bit length, and the timing interval between bits constituting each word, is controlled accurately by the distributor 86.

Using a "last-to-operate" contact finger as the start control ensures that the distributor or sampler will not sample any capacitor 90 before it has received its charge from the corresponding contact fingers of the operated key.

While the invention has been described herein in considerable detail, it is to be understood that various changes in its details may be made, as will be obvious to those skilled in such matters, without departing from the spirit and scope of the invention as defined in the appended claims.

What is claimed is:

1. A selective-contact encoding keyboard, comprising:

(a) a circuit board providing spaced groups coplanar conductors, (b) an array of flat spring contact tongues mounted above said board, all of said tongues lying normally in a common plane parallel to end spaced from the plane of said conductors, each tongue having independently flexible downwardly inclined contact fingers moved, upon downward depression of such tongue, into substantially simultaneous engagement with selective ones of said conductors, and (c) an array of generally coplanar spaced-apart snap-action monostable discs which return to the stable non-operated configuration after release of pressure thereon, said discs being supported above said respective contact tongues for selective depression thereof towards said circuit board conductors.

2. A keyboard in accordance with claim 1 in which one of the contact fingers of each tongue is adjusted at a shallower angle of inclination than the other fingers of that tongue, so as to engage its underlying conductor at a later point, in the downward travel of said tongue, than do the other contact fingers thereof.

3. A keyboard in accordance with claim 1, including a code-perforated insulative sheet fixedly mounted between said conductors and said contact fingers, to selectively inhibit the making of predetermined circuits via said fingers.

4. A keyboard in accordance with claim 1, including an indicia sheet bearing visible indicia positioned above the respective discs.

5. A keyboard in accordance with claim 1, including a sheet of locally flexible, tough impervious material positioned above said array of discs.

6. A keyboard in accordance with claim 1, in which said array of contact tongues is formed from a continuous conductive sheet of spring stock, locally perforated to define said tongues and fingers.

7. A keyboard in accordance with claim 5, in which said circuit board, said arrays and said sheet are compressed together to form a flat laminar sandwich.

8. A manual keyboard coding apparatus for transmitting to an output circuit pulse groups of standardized pulse shape and time relation, comprising a plurality of momentary-closure multiple-contact keys, a source of current controlled by the contacts of said keys, a plurality of pulse-integrating energy-storage circuit devices connected to corresponding contacts of the respective keys to store energy in said devices in accordance with the operation of a selected key, and pulse differentiating means controlled by one contact of each key for discharging the stored energy of all of said devices to the output circuit.

9. A coding device in accordance with claim 8, in which said circuit devices are condenser-resistor pulse shaping devices.

10. A coding device in accordance with claim 8 in which said pulse-differentiating means controls a sequential sampling switch.

References Cited by the Examiner

UNITED STATES PATENTS

| | | | |
|---|---|---|---|
| 1,882,106 | 10/1932 | Wise | 179—90.1 |
| 2,381,835 | 8/1945 | Moorhead | 200—83.2 |
| 2,391,238 | 12/1945 | Horman | 200—83.2 |
| 2,517,033 | 8/1950 | Russell | 339—252 |
| 2,888,665 | 5/1959 | Haggadone | 178—26.5 |
| 2,932,816 | 8/1960 | Stiefel et al. | 200—16 |

NEIL C. READ, *Primary Examiner.*

THOMAS A. ROBINSON, *Examiner.*

A. J. DUNN, *Assistant Examiner.*